(12) United States Patent
Strock et al.

(10) Patent No.: US 8,100,640 B2
(45) Date of Patent: Jan. 24, 2012

(54) BLADE OUTER AIR SEAL WITH IMPROVED THERMOMECHANICAL FATIGUE LIFE

(75) Inventors: Christopher W. Strock, Kennebunk, ME (US); Philip R. Belanger, Acton, ME (US)

(73) Assignee: United Technologies Corporation, Hartford, CT (US)

( * ) Notice: Subject to any disclaimer, the term of this patent is extended or adjusted under 35 U.S.C. 154(b) by 1125 days.

(21) Appl. No.: 11/977,579

(22) Filed: Oct. 25, 2007

(65) Prior Publication Data

US 2009/0110536 A1 Apr. 30, 2009

(51) Int. Cl.
*F01D 5/20* (2006.01)
(52) U.S. Cl. .................................................. 415/173.4
(58) Field of Classification Search ............... 415/173.4, 415/174.4
See application file for complete search history.

(56) References Cited

U.S. PATENT DOCUMENTS

| | | | |
|---|---|---|---|
| 4,422,648 A | 12/1983 | Eaton et al. | |
| 4,566,700 A | 1/1986 | Shiembob | |
| 4,767,266 A | 8/1988 | Holz et al. | |
| 4,936,745 A | 6/1990 | Vine et al. | |
| 5,022,816 A | 6/1991 | Maier et al. | |
| 5,423,659 A | 6/1995 | Thompson | |
| 5,439,348 A * | 8/1995 | Hughes et al. | 415/173.4 |
| 5,551,840 A | 9/1996 | Benoit et al. | |
| 5,791,871 A | 8/1998 | Sech et al. | |
| 6,146,089 A | 11/2000 | Allen et al. | |
| 6,350,102 B1 | 2/2002 | Bailey et al. | |
| 6,358,002 B1 | 3/2002 | Good et al. | |
| 6,537,021 B2 | 3/2003 | Howard et al. | |
| 6,670,046 B1 * | 12/2003 | Xia | 428/469 |

* cited by examiner

*Primary Examiner* — Nathaniel Wiehe
(74) *Attorney, Agent, or Firm* — Kinney & Lange, P.A.

(57) ABSTRACT

A blade outer air seal for a gas turbine has an abradable coating with a substantially uniform thickness during service use. Prior to being placed in service, the abradable coating has a central portion with a greater thickness than leading and trailing portions. When placed in service, the blade outer air seal is positioned so that the central portion of the abradable coating with the greater thickness is located in a blade rub path of the turbine blades. As a result of abrasion in the blade rub path, the thickness of the central portion of the abradable coating is reduced so that it becomes substantially similar to the thickness of the leading and trailing portions.

12 Claims, 4 Drawing Sheets

BLADE OUTER AIR SEAL WITH IMPROVED THERMOMECHANICAL FATIGUE LIFE

BACKGROUND

The invention relates to an abradable protective coating for blade outer air seals, and more particularly to an abradable coating that is geometrically conditioned to result in more uniform thermal heat flux regions throughout the blade outer air seal.

Blade outer air seals in the high pressure, high temperature regions within a gas turbine engine generally include some form of protective layering, such as a thermal barrier coating (TBC). These protective layers function to protect the blade outer air seals from oxidation, corrosion, and thermal-mechanical fatigue that can reduce part life and the repair-ability of engine run parts. In conventional blade outer air seals, the seals include an abradable ceramic TBC that is removed over the life of the part by the rotation of turbine blades adjacent it. The effect of turbine blade abrasion is to create a clearance pocket on the blade outer air seal radially adjacent the turbine blade tips. Abrasion of the TBC typically provides a minimum clearance between the outer air seals and the turbine blades such that gas flow around the tips of the turbines is reduced. This reduction in gas flow prevents leakage that would result in reduction of engine efficiency.

Although the pocket assists in reducing gas flow around the blade tips, some of the ancillary effects of this pocket are generally not desirable. The pocket is generally more pronounced along a turbine blade rub path that is created by rotating motion of the turbine blades relative to the static blade outer air seal. The pocket is also a region of high heat flux due to aerodynamics and less insulating material being located in that region. One drawback of the conventional pocket blade outer air seal design is that it geometrically creates a non-uniform TBC thickness. The overall effect of this non-uniformity in the TBC creates a thermal gradient that increases thermal-mechanical fatigue, and concentrates stresses in the blade outer air seals. This phenomena accelerates base metal degradation in the pocket area.

There is a need for a blade outer air seal that will result in reduced thermal gradients and reduced associated heat transfer, stress, and thermal mechanical fatigue.

SUMMARY

A blade outer air seal for a gas turbine includes an abradable coating that is shaped to reduce or eliminate creation of a pocket of reduced layer thickness. In one embodiment, the abradable coating has thickness within a blade rub path area that is greater than its thickness in areas outside the blade rub path. A portion of the greater thickness coating in the blade path area is removable by service use of the gas turbine, so that a generally uniform thickness of the abradable coating results.

A method of manufacturing a blade outer air seal includes the steps of providing a blade outer air seal with an abradable coating that has areas of different thickness, disposing the blade outer air seal within a gas turbine; and causing turbine blades to rotate and remove a portion of the abradable coating in a blade rub path so that the abradable coating has a generally uniform thickness during regular service use of the gas turbine.

DETAILED DESCRIPTION

Figure 1:
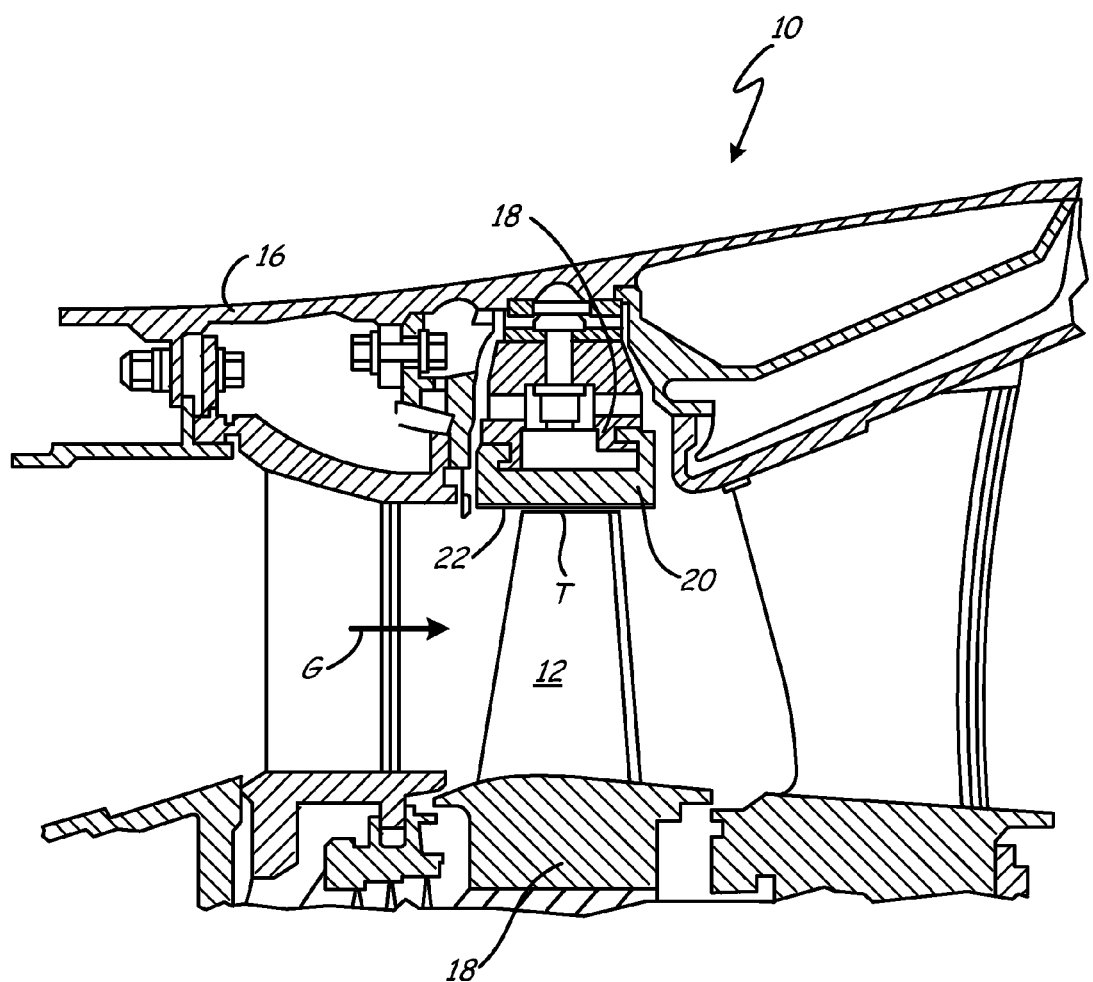
FIG. 1 illustrates a cross-sectional view of a turbine section of a gas turbine engine.

FIG. 1 shows portions of high pressure turbine section 10 of a gas turbine engine. Turbine section 10 includes turbine blades 12 that extend radially outward from rotor disk (not shown). Blade outer air seals 20 are arranged circumferentially around the outer ends of blades 12 and act as an outer wall for gas flow G in the turbine section 10. Blade outer air seal 20 is secured by a support section 18 to outer case 16, which creates a boundary for gas flow G and extends around turbine section 10.

Blade outer air seals 20 include an abradable coating 22 on their inner surface which faces and interacts with the tips T of blades 12. Abradable coating typically includes a bond coat on the substrate of blade outer air seal 20, and a thermal barrier coating (TBC) over the bond coat. The substrate of blade outer air seal 20 is typically a nickel or cobalt based superalloy.

The bond coat may be, for example a MCrAlY alloy or an aluminide layer (such as nickel aluminide, nickel chromium aluminide, and platinum aluminide). MCrAlY refers to metal coating composition in which M denotes nickel, cobalt, iron, or mixtures thereof; Cr denotes chromium; Al denotes aluminum; and Y denotes yttrium. The bond layer can be deposited onto the substrate utilizing processes such as a thermal spray, vapor deposition, arc deposition, sputtering, or electron beam physical vapor deposition. The thickness of the bond coat generally ranges from between about 0.13 mm to 0.3 mm (about 5 to 12 mils).

The abradable TBC may be, for example, of a ceramic such as yttria stabilized zirconia, although other TBCs can be used. One example of a commonly used TBC is 7 or 8 weight percent yttria stabilized zirconia. The thickness of the TBC generally ranges from between about 0.25 mm to about 1.02 mm (10 to 40 mils) for aircraft applications and about 12 mm to about 31.2 mm (473 to 1230 mils) for industrial gas turbine power generation applications.

The tip clearance between turbine blades 12 and blade outer air seals 20 is very small, typically about 0.00 mm to about 1.27 mm (0 mils to 50 mils). Abrasion of the TBC will result in a blade rub path due to thermal, centrifugal, and maneuver load induced blade-to-air seal interaction. Much of this interaction is due to non-synchronized disk and case expansion/shrinkage. In the past, this abrasion of the TBC has produced a pocket in the TBC along the blade rub path.

With the present invention a more uniform thickness TBC on blade outer air seal 20 during use can be achieved by initially forming the TBC with a greater thickness in the blade rub path area than in the adjacent area of the TBC, such as the leading and trailing areas of the TBC upstream and downstream respectively, from the blade rub area. When blade outer air seals 20 are initially installed and turbine 10 is run, blade tip abrasion of the thicker rub path area of the TBC will cause the thickness of the blade rub path area to be reduced until the TBC has an essentially uniform thickness across both the rubbed and adjacent unrubbed areas.

Figure 2:
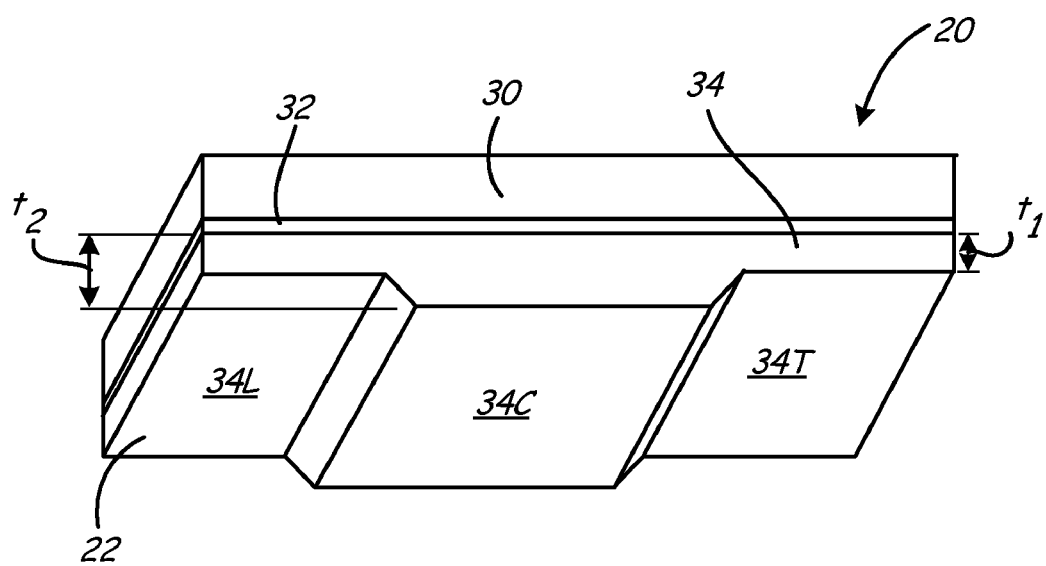
FIG. 2 illustrates a portion of a blade outer air seal prior to service use of the gas turbine engine.
Figure 3:
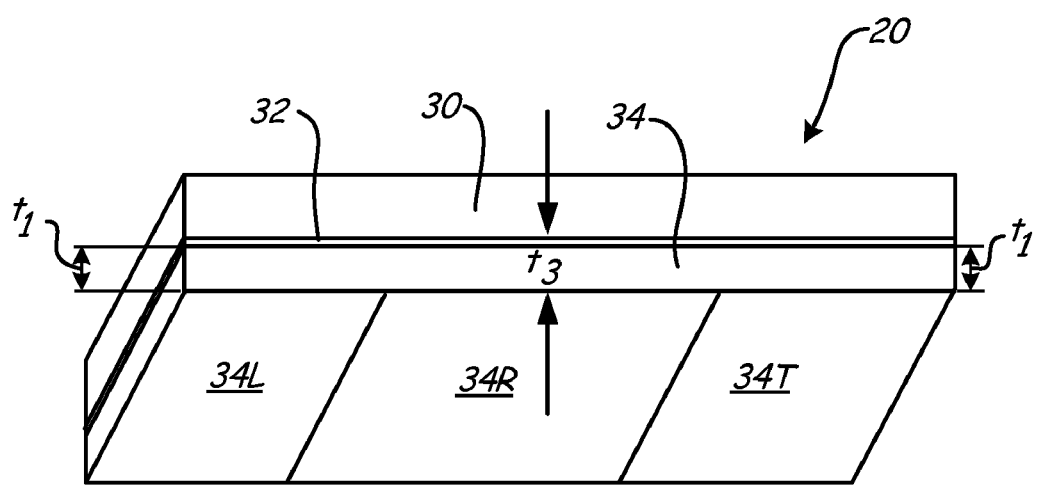
FIG. 3 illustrates a portion of the blade outer air seal of FIG. 2 after service use of the gas turbine engine.

FIGS. 2 and 3 illustrate a first embodiment in which blade outer air seal 20 includes substrate 30, and abradable coating 22 includes bond coat 32, and thermal barrier coating 34. FIG. 2 shows blade outer air seal 20 before turbine 10 is operated and abrasion of TBC 34 in the blade rub path has occurred. FIG. 3 shows blade outer air seal 20 after turbine 10 has run and abrasion of TBC 34 has established a final thickness of TBC 34 in the blade rub path.

In FIG. 2, TBC 34 includes leading portion 34L and trailing portion 34T of thickness $t_1$, and central portion 34C of greater thickness $t_2$. TBC may be deposited as a uniform thickness layer of thickness $t_2$, and leading and trailing portions 34L and 34T can then be formed by selective removal using abrasive grinding, milling, lapping, water jetting, laser removal, single or multipoint turning, or other removal techniques. Alternatively, central portion 34C may be deposited to a greater thickness using controlled spraying or masking processes. Thickness $t_1$ is determined to be the thickness necessary to create a clearance fit between TBC 34 and the turbine blade tip T when blade outer air seal 20 is secured by support section 18 to outer case 16. Typically, acceptable industry standards for the clearance distance between the blade outer air seal 20 and turbine blade tip T is between about 0.025 mm (1 mil) and about 1.27 mm (50 mils). Central portion 34C of TBC 34 is initially left proud with a radial thickness $t_2$ greater than thickness $t_1$. Central portion 34C is located so that it will be within the blade rub path of turbine blade 12. This blade rub path is created by motion of turbine blade 12 in the circumferential direction along TBC 34 relative to stationary blade outer air seal 20. When the blade outer air seal 20 is initially secured by support section 18 to outer case 16, and the engine operated, the resulting thermals and dynamics generated may create an interference fit between the turbine blade tip T and central portion 34C.

The radial thickness $t_1$ required for the leading and trailing portions 34L, 34T can be predetermined by modeling factors such as turbine blade expansion or blade outer air seal abradable loss under turbine operating conditions (i.e. temperature and pressure). Alternatively radial thickness $t_1$ can be predetermined during repair or replacement by measuring turbine blade 12 rub depth along the turbine rub path of the blade outer seal 20 being repaired or replaced.

FIG. 3 illustrates blade outer air seal 20 after initial service use of the gas turbine engine 10. The greater thickness of central portion 34C (shown in FIG. 2) has been reduced by rotation of turbine blade 12 relative to the blade outer air seal 20. Blade rub portion 34R of TBC 34 now has a radial thickness $t_3$ similar to or identical to thickness $t_1$ of leading portion 34L and trailing portion 34T. This radial thickness $t_1$ is typically the thickness necessary to create a clearance fit between TBC 34 and turbine blade tip T during normal service use of the turbine 10. In embodiments, variations between the radial thickness $t_1$ of leading and trailing portions 34L and 34T and radial thickness $t_3$ of blade rub portion 34R of between about 0.025 mm (1 mil) and about 0.125 mm (5 mil) may be achieved. In other embodiments, variations may occur depending on the type of TBC utilized, for example a variation between $t_1$ and $t_3$ of greater than about 0.125 mm (5 mil) may be experienced when a zirconia based ceramic is utilized. Variations of less than about 0.025 mm (1 mil) between the radial thickness $t_1$ of leading and trailing portions 34L and 34T and radial thickness $t_3$ of blade rub portion 34R are also possible. Thus, the resulting TBC 34 has substantially uniform radial thickness. The geometric uniformity of TBC 34 leads to reduced thermal gradients in the blade outer air seal 20, reduced heat transfer, and reduced thermal-mechanical fatigue.

Figure 4:
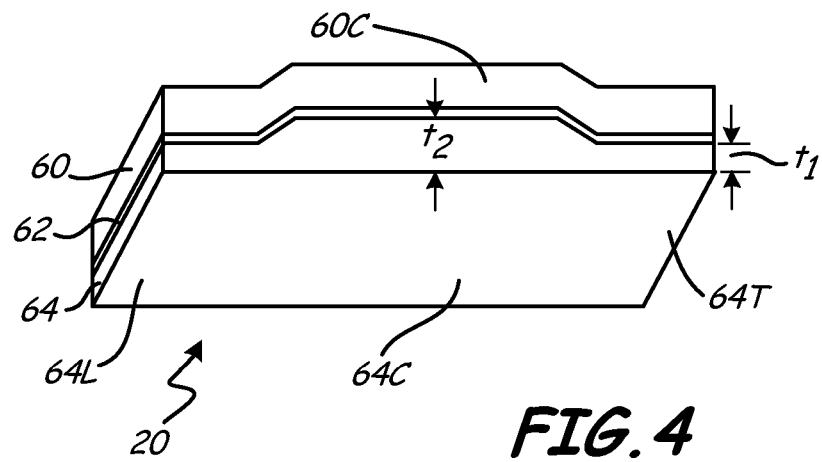
FIG. 4 illustrates another embodiment of the blade outer air seal prior to service use of the gas turbine engine.
Figure 5:
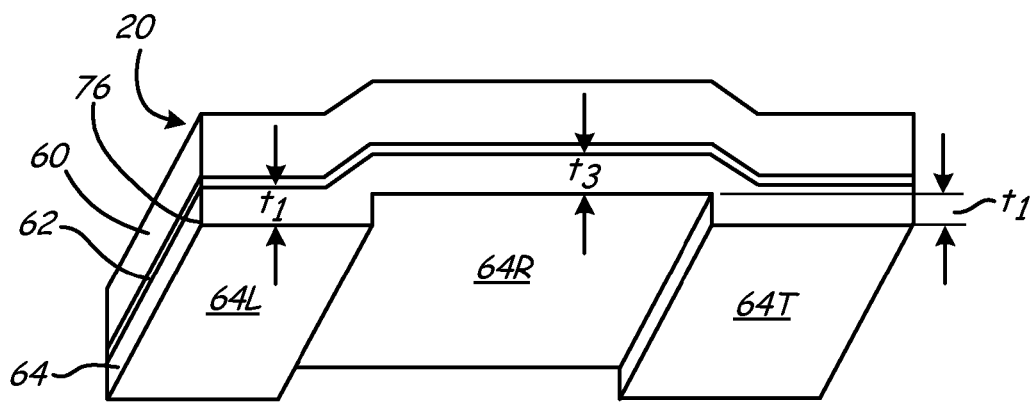
FIG. 5 illustrates the blade outer air seal of FIG. 4 after service use of the gas turbine engine.

FIGS. 4 and 5 show another embodiment of blade outer air seal 20. In FIG. 4, the blade outer air seal 20 includes substrate 60, bond coat 62 and TBC 64, and substrate 60 has a circumferentially extending central depression 60C. TBC 64 has an outer surface profile that is generally flat prior to service use, so that leading portion 64L and trailing portion 64T have a thickness $t_1$ while central portion 64C has a greater thickness $t_2$. Thus, the TBC 64 is initially deposited with a substantially uniform outer surface but with differing thicknesses $t_1$ and $t_2$. The outer surface of TBC 64 may also be formed to follow the contour of substrate 60, for example, by a material removal process such as lapping or grinding after TBC 64 has been deposited. Alternatively, deposition of TBC 64 can be varied to produce areas of different thickness as shown in FIG. 4.

FIG. 5 illustrates blade outer air seal 20 of FIG. 4 after initial service use of gas turbine 10. In blade rub portion 64R, material has been removed by radial and thermal interaction of turbine blade 12 relative to static blade outer air seal 20. Blade rub portion 64R (which is located in what was the thicker central portion 64C of TBC 64 in FIG. 4) has a radial thickness $t_3$ similar to or identical to that of the radial thickness $t_1$ of leading portion 64L and trailing portion 64T. Because of the similarity in thicknesses $t_1$ and $t_3$ of TBC 64 after blade rub portion 64R has formed, blade outer air seal 20 receives a more uniform heat flux.

By pre-shaping the abradable protective coating (e.g. a TBC) on blade outer air seals to compensate for material that will be removed in the blade rub path, a more uniform thickness TBC is achieved during service use. By reducing or eliminating a pocket area of differing thickness in the abradable TBC of the blade outer air seals 20, thermal-mechanical cracking and associated stresses in the blade outer air seal 20 can be reduced. This helps to prevent the base metal of the blade outer air seal from being exposed in the blade path, and therefore, reduce heat transfer, thermal gradients and thermal-mechanical fatigue later in engine life after there has been TBC thickness loss by erosion.

Although the present invention has been described with reference to preferred embodiments, workers skilled in the art will recognize that changes may be made in form and detail without departing from the spirit and scope of the invention. For example, other materials such as ceramic fiber composite or ceramic foam may be used as abradable coatings rather than conventional thermal sprayed or physical vapor deposited ceramic TBCs.

The invention claimed is:

1. A blade outer air seal for use in a gas turbine having a rotor disk and a plurality of turbine blades extending radially outward from the rotor disk, the blade outer air seal comprising:
   a substrate; and
   an abradable coating supported by the substrate and facing the rotor disk, the abradable coating having a first area with a first thickness and a second area with a second thickness greater than the first thickness, the second area shaped to be disposed in a blade rub path and abraded by turbine blades during service use to a third thickness substantially similar to the first thickness.

2. The blade outer air seal of claim 1, wherein the abradable coating comprises a thermal barrier coating.

3. The blade outer air seal of claim 2, wherein the abradable coating further comprises a bond coat between the substrate and the thermal barrier coating.

4. The blade outer air seal of claim 1, wherein the first area is disposed adjacent the second area.

5. The blade outer air seal of claim 1, wherein the first area includes at least one of a leading portion and a trailing portion of the abradable coating.

6. The blade outer air seal of claim 1, wherein the first area and the second area provide a substantially flat outer surface prior to abrasion of the second area in service by the turbine blades.

7. The blade outer air seal of claim 1, wherein the second area extends radially inward with respect to the first area.

8. A method of providing a blade outer air seal with a substantially uniform abradable coating thickness during use in a gas turbine, the method comprising:
   providing a blade outer air seal with an abradable thermal barrier coating having a leading portion and a trailing portion of a first thickness and a central portion of an initial second thickness that is different than the first thickness;
   disposing the blade outer air seal within a gas turbine so that the central portion is located in a blade rub path of adjacent turbine blades; and
   rotating the turbine blades so that thickness of the central portion is reduced by abrasion to a third thickness, wherein the third thickness is approximately equal to the first thickness.

9. The method of claim 8, wherein the step of providing the blade outer air seal includes:
   depositing a substantially uniform thickness abradable thermal barrier coating on a blade outer air seal substrate; and,
   selectively removing some of the abradable thermal barrier coating from the leading and trailing portions to define the first thickness.

10. The method of claim 8, wherein the step of providing the blade outer air seal includes:
    depositing the abradable thermal barrier coating on a blade outer air seal substrate to a first thickness in the leading and trailing portions, and
    selectively depositing the abradable thermal barrier coating to a thickness in the central portion greater than the first thickness.

11. The method of claim 8, wherein the step of providing a blade outer air seal includes:
    depositing a bond coat on a substrate; and
    depositing a thermal barrier coating on the bond coat to form the abradable thermal barrier coating.

12. The method of claim 8, wherein the blade outer air seal includes a substrate having a circumferentially extending central depression generally aligned with the central portion of the blade outer air seal.

\* \* \* \* \*